Sept. 1, 1925.
C. G. EDWARDS
BEARING LUBRICATOR
Filed Feb. 16, 1925
1,551,649
REISSUED AS NO. 16337 APRIL 27 1926
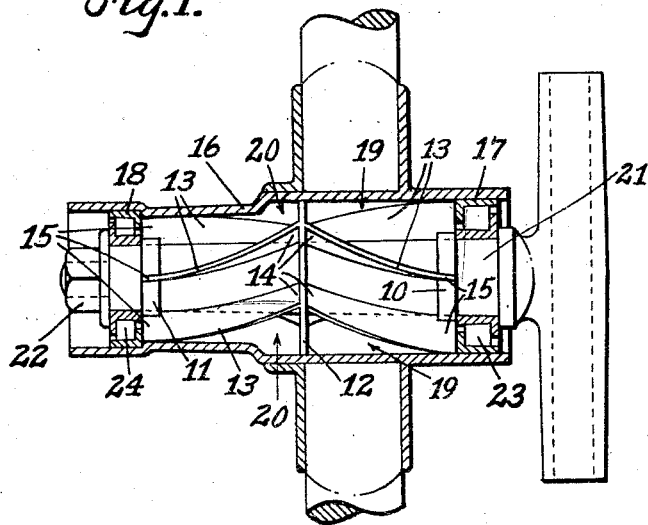
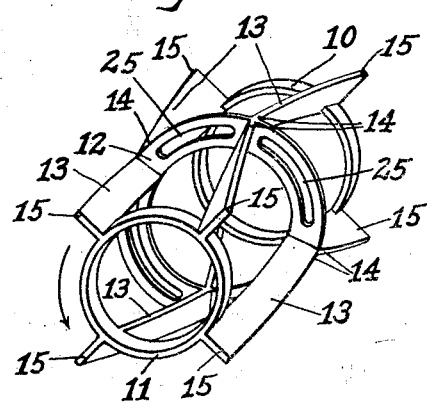
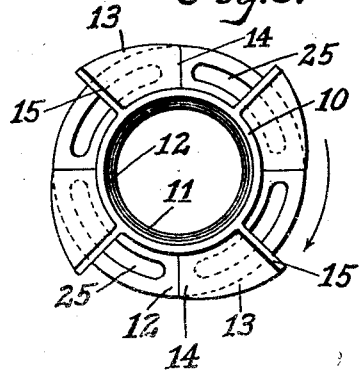
INVENTOR,
Clarence G. Edwards
BY
ATTORNEY.

Patented Sept. 1, 1925.

1,551,649

UNITED STATES PATENT OFFICE.

CLARENCE G. EDWARDS, OF LOS ANGELES, CALIFORNIA.

BEARING LUBRICATOR.

Application filed February 16, 1925. Serial No. 9,485.

*To all whom it may concern:*

Be it known that I, CLARENCE G. EDWARDS, a citizen of Canada, residing at Los Angeles, in the county of Los Angeles and State of California, have invented new and useful Improvements in Bearing Lubricators, of which the following is a specification.

My invention relates to lubricating devices for use with ball bearings or roller bearings in vehicle wheels and the like.

The main object of my invention is to provide a lubricating device adapted to be fixed in the hubs of wheels, such as front wheels of automobiles or other vehicles, between the outer and inner ball or roller bearings thereof, so that a reserve supply of lubricant can be carried within the hub in such a way that it will be fed from the middle of the hub toward its ends and into said bearings as it is needed.

Other objects and advantages will appear hereinafter and while I show herewith and will describe a preferred form of construction, I desire it to be understood that I do not limit my invention to such preferred form but that various changes and adaptations may be made therein without departing from the spirit of my invention as hereinafter claimed.

Referring to the drawings which accompany this specification and form a part thereof:

Fig. 1 is a longitudinal sectional view of the left front wheel of an automobile equipped with my bearing lubricator, the section being taken vertically through the axis of the hub and the bearing lubricator being shown in side elevation fixed in the hub.

Fig. 2 is a view in perspective of the bearing lubricator shown in Fig. 1, by itself.

Fig. 3 is an end view of the bearing lubricator, shown in Figs. 1 and 2, as seen from the inner or larger end thereof.

The bearing lubricator as clearly shown in Fig. 2 consists of an inner ring 10, an outer ring 11 and an intermediate ring 12, all of which are adapted to turn loosely on the spindle of the wheel in which the lubricator is to be used, and equally spaced radial blades 13 extending obliquely from the middle ring to the end rings and having their ends fixed to the rings so that both rings and blades are rigidly held in spaced relation to each other. The inner and outer rings 10 and 11 are band-rings and the intermediate ring 12 is a disc-ring having a depth equal to the width of blades 13 at the middle point of the hub.

The blades are preferably arranged in pairs with their adjacent ends 14 fixed to middle ring 12 in the same radial plane and extending laterally therefrom at an angle to each other toward end rings 10 and 11 to which their opposite ends 15 are fixed, also in the same radial plane. The attachment of rings 10 and 11 to ends 15 of the blades, being at the inner edges of the latter only, the spaces between ends 15 of adjacent blades on each end of the lubricator are for the most part open, while disc ring 12 between ends 14 of the blades serves as a partition to divide longitudinally the intervening spaces between adjacent pairs of blades into two approximately equal parts.

The lubricator thus formed is fitted into a hub 16 between the inner and outer bearing cups 17 and 18, as shown in Fig. 1, so tightly that it turns with the hub, or it may be keyed therein to insure turning therewith. In any case the lubricator must be so placed in the hub that the adjacent ends 14 of blades 13 are in advance of ends 15 thereof, in the direction of normal rotation, as illustrated in Figs. 2 and 3, it being understood that a similar lubricator with blades arranged for a right wheel must be provided for the right wheel of a vehicle.

Having been fixed in the wheel as described, the lubricator forms inner chambers 19 and outer chambers 20 within the hub, between its blades and the inner surface of the hub. A supply of lubricant is placed in these chambers and the wheel is applied to the spindle 21 and secured thereon by retaining nut 22 in the usual way.

The operation of my bearing lubricator is evident. When the wheel is turning rapidly sufficient centrifugal force is produced to cause the lubricant to gather in the outer part of chambers 19 and 20 and as the speed is increased the centrifugal force together with the inertia of the lubricant causes the latter to follow the blades from the middle to the ends of the lubricator where it is thrown directly into the bearings 23 and 24.

In order that there may be communication between inner and outer chambers 19 and 20 respectively, so as to insure an equal distribution of lubricant in both ends of the hub, apertures 25 may be made in disc-ring 13 between the blades, as shown in Figs. 2 and 3.

While I have shown four pairs of blades in the drawings it is evident that a greater or smaller number might be used with a similar effect. The angle between the inner and outer blade of each pair may also be increased or diminished as may be found advisable for best results. Furthermore, instead of arranging the blades in pairs as shown, the inner blades might be staggered in relation to the outer ones with the same general results.

Having thus illustrated and described my invention, I claim:

1. A bearing lubricator comprising three rings arranged on a common axis and a plurality of regularly spaced blades fixed to said rings so as to hold them in spaced relation to each other, said blades in turn being held in spaced relation to each other by said rings.

2. A bearing lubricator comprising three rings and a plurality of regularly spaced blades fixed to said rings so as to extend edgewise radially therefrom, said blades being held in spaced relation to each other by said rings and said rings being held in spaced relation to each other on a common axis by said blades.

3. A bearing lubricator comprising three rings, an inner, an outer and an intermediate ring, arranged on a common axis in spaced relation to each other, and a plurality of regularly spaced radial blades fixed to said rings, said blades extending obliquely with reference to the common axis of said rings from said intermediate ring to said inner and outer rings.

4. A bearing lubricator for use in wheel hubs, comprising an inner ring, an outer ring and an intermediate ring arranged in spaced relation to each other on a common axis, and a plurality of regularly spaced radial blades fixed to said rings so as to extend obliquely from said intermediate ring to said inner and outer rings in the same circumferential direction.

5. A bearing lubricator, for use in wheels having roller or ball bearings, comprising an inner band-ring, an outer band-ring and an intermediate disc-ring arranged in spaced relation to each other on a common axis, and a plurality of regularly spaced radial blades fixed to said rings, said blades being arranged in pairs having adjacent ends attached to said intermediate disc-ring in the same radial plane and extending obliquely at an angle to each other from said intermediate disc-ring to said inner and outer band-rings and having their opposite ends attached to said inner and outer band-rings in the same radial plane, so that when fixed in the hub of a wheel said blades cooperate therewith to form open ended chambers adapted for receiving a lubricant.

CLARENCE G. EDWARDS.